United States Patent [19]
Hoddinott et al.

[11] 3,859,001
[45] Jan. 7, 1975

[54] QUILL DRIVE MECHANISM FOR MACHINE TOOLS

[75] Inventors: William M. Hoddinott, Milford; Richard J. Hreschak, Monroe, both of Conn.

[73] Assignee: Textron Inc., Providence, R.I.

[22] Filed: Nov. 7, 1973

[21] Appl. No.: 413,608

[52] U.S. Cl............... 408/3, 408/10, 408/14, 408/137, 90/22
[51] Int. Cl............... B23b 39/08, B23b 47/20
[58] Field of Search............. 408/3, 10, 12, 14, 129, 408/137, 138; 90/13 C, 22; 173/19; 74/424.8 R, 441

[56] References Cited
UNITED STATES PATENTS

| | | | |
|---|---|---|---|
| 2,933,941 | 4/1960 | Millns | 90/22 X |
| 3,055,273 | 9/1962 | Thomas | 90/22 |
| 3,640,147 | 2/1972 | Fantoni | 408/137 X |
| 3,711,212 | 1/1973 | Kuck | 408/14 |
| 3,740,161 | 6/1973 | Milewski | 408/12 |

*Primary Examiner*—Gil Weidenfeld
*Attorney, Agent, or Firm*—Arthur A. Johnson

[57] ABSTRACT

There is disclosed a quill advancing and retracting mechanism in which the quill is provided with a tubular extension having an external helical groove shaped to receive the ball bearings of a power driven ball screw nut. In the form shown, the tubular extension has a single helical groove having a determinate pitch, and the nut has two ball-carrying circuits, each having ball return means, the two circuits being axially offset relative to each other to preload the nut and take up the lost motion between the balls of the nut and the helical groove. The nut is driven by a timing belt connected to a stepping motor. With the combination of the preloaded ball bearing nut and the stepping motor, it is possible to control the movement of the quill so it and the tool carried by the spindle may be stopped at any point with an accuracy of about 0.0005 inches per foot cumulative, the balls in one circuit of the nut pressing against one side wall of the helical groove while the balls in the other circuit press against the other side of the groove and thus take up any lost motion between the balls and the groove.

3 Claims, 4 Drawing Figures

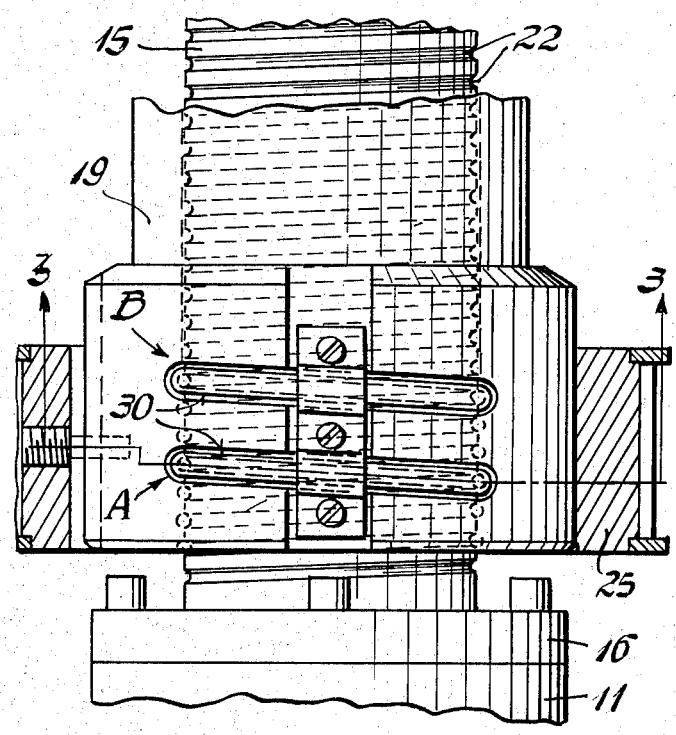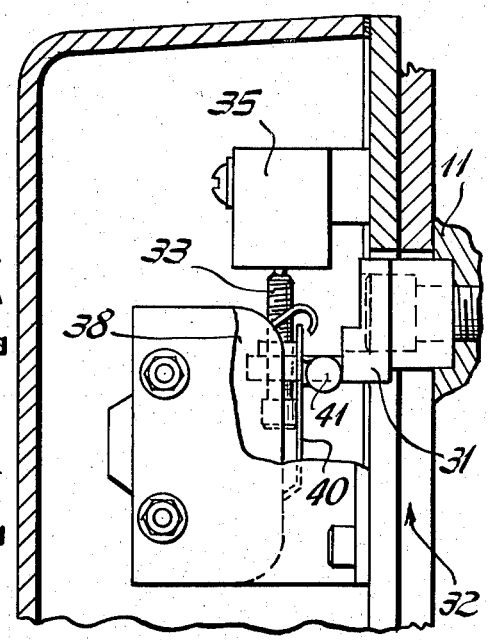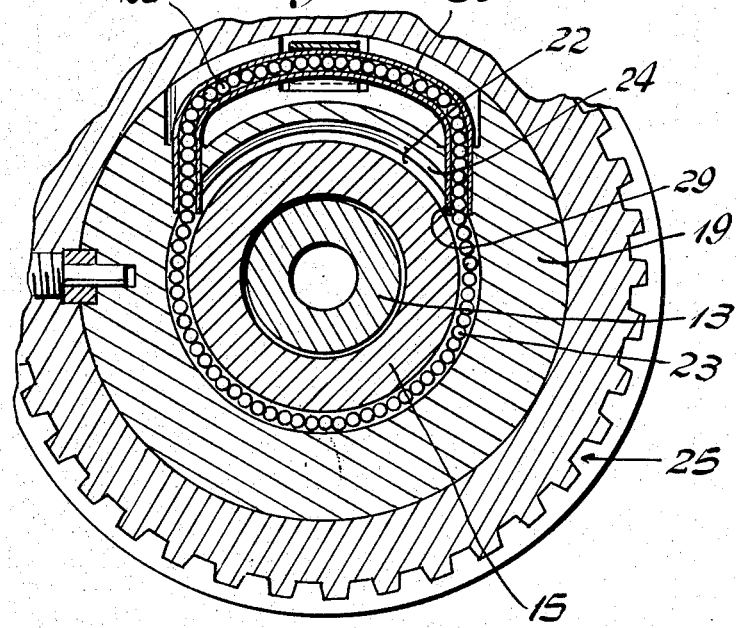

QUILL DRIVE MECHANISM FOR MACHINE TOOLS

This invention relates to means for advancing and retracting a working tool carried by a spindle to and from the work.

In situations in which a plurality of different working tools are employed successively on a workpiece while it remains in fixed position on the worktable and where several tools have working strokes which vary from tool to tool, it has been a custom to provide a series of adjustable stops to be engaged by means connected to the spindle or quill to physically cause the travel of the quill and spindle to stop when the desired depth of cut has been made on the work or other operation is performed, the means carrying the stops being capable of being indexed to bring selected stops into operative position according to the working stroke of the particular tool then in the spindle and the length of travel of the tool to be made.

Heretofore, it was difficult without said stops to accurately control the working stroke of the tool by merely stopping the driving motor because of the backlash between the threaded quill advancing means and the power operated nut by which the quill is advanced and retracted.

An object of this invention is to provide means for stopping the advancement of the working tool at an infinite number of places in its travel by merely stopping the motor which actuates the quill at precisely the point desired.

For this purpose the present invention provides a stepping motor and means for advancing and retracting the quill by means of a continuous helical groove of a determinate pitch to receive a preloaded ball bearing nut and screw means and means for rotating the nut by the stepping motor controlled by a work programming unit, so that after the motor has rotated a predetermined number of steps it will instantly stop with the tool located at exactly the desired place. When the programming unit cuts off power to the motor there will be no drifting of the quill because of the preloading on the nut. The motor may then immediately reverse and return the spindle to starting position.

To insure that the quill will stop at exactly the correct position in its downward stroke, the present invention incorporates positive means for limiting the upward movement of the quill. This is preferably controlled by a limit switch which is mounted on the spindle frame and is operated by a lug projecting from the quill.

In order to speed up the return stroke of the quill and yet avoid the quill striking the limit switch at maximum speed, the present invention provides a decelerating switch which causes the motor to slow down as the upper limit of the quill is approached.

In addition to the limit switch and the decelerating switch, there may be provided a bottom switch which may be used to stop the quill at the bottom of its stroke when the full stroke of the tool is required, for intance when drilling through a workpiece.

After the working tool has been changed, whether by hand operation or automatically, and/or the work has been shifted relative to the spindle axis, usually transversely of the spindle, the quill operating means is again energized and the ball-nut will be rotated by the motor to cause the quill, spindle and tool to travel toward the work until a signal is transmitted to motor by the program apparatus whereupon the quill will instantly stop travelling.

Other features and advantages will hereinafter appear.

In the accompanying drawings:

FIG. 2 is a fragmentary view of a portion of the feed nut for the quill.

FIG. 3 is a cross-section of the feed nut and the quill extension taken on the line 3—3 of FIG. 2.

FIG. 4 is an elevational view of the quill stop, limit switch, decelerating switch and lug for operating the switches.

Figure 1:
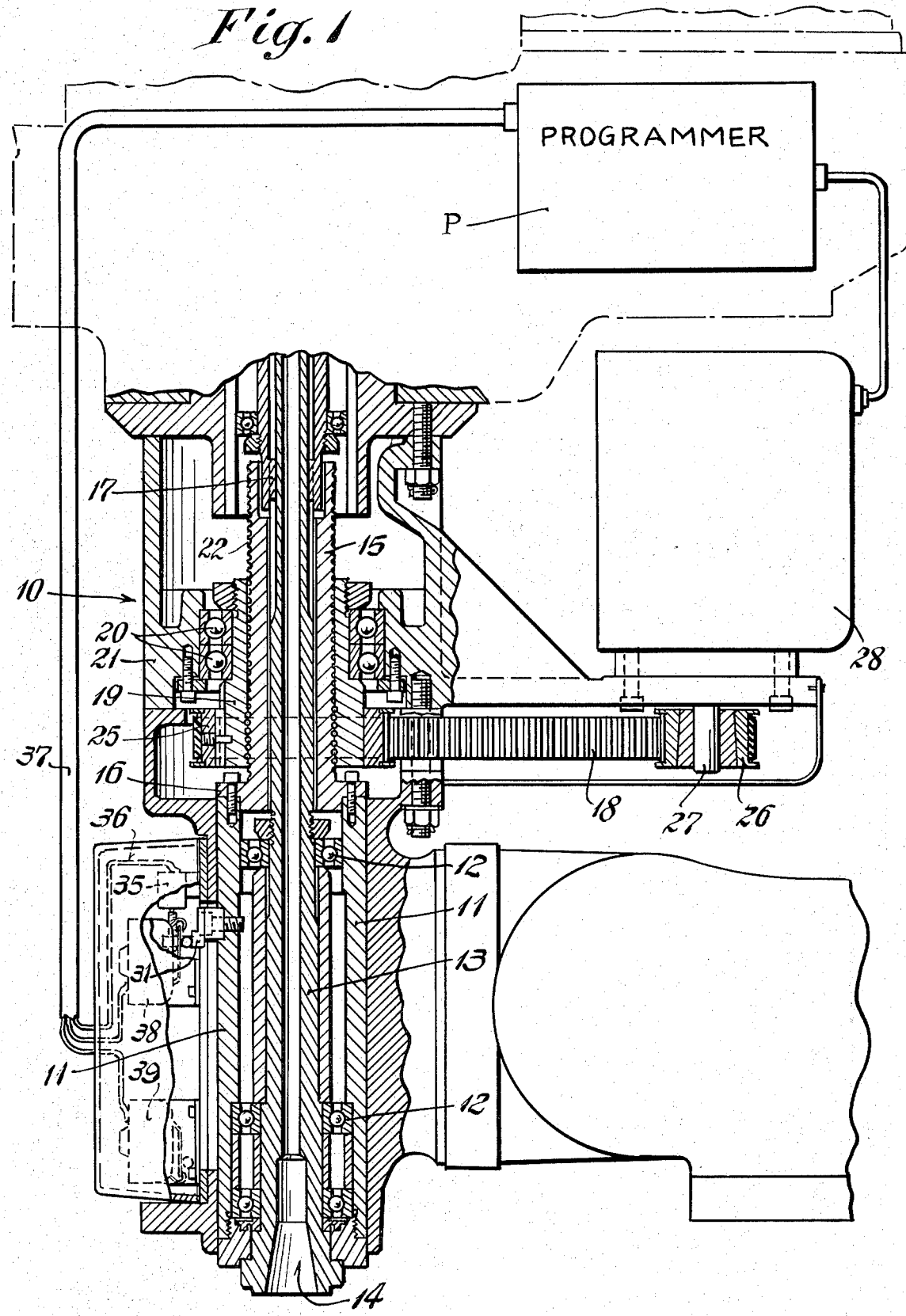
FIG. 1 is a vertical section through the spindle frame and associated parts showing the means for advancing and retracting the quill, and hence the spindle, according to the present invention.

As shown in FIG. 1, the spindle unit comprises a frame 10 in which a quill 11 is mounted for sliding vertical movement in the frame. Rotatably mounted in the quill 11 on bearings 12 for vertical movement therewith is a spindle 13, the lower end of which is provided with a tapered socket 14 to receive the tapered arbor of a working tool.

Secured to the upper end of the quill 11 is a quill extension 15 which is tubular and has a base 16 secured to the quill 11. The spindle 13 extends beyond the quill extension 15 and has a spline connection 17 with power-operated means (not shown) for rotating the spindle.

The quill and spindle are moved downwardly and upwardly to carry a tool mounted in the spindle socket 14 to and from the work by a motor driven belt 18 which drives a feed nut 19 mounted for horizontal rotation on bearings 20 mounted on a fixed portion 21 of the frame 10.

According to the present invention, the tubular extension 15 of the quill is provided with a helical groove 22 in its outer surface to receive ball bearings 23 carried in a similar groove 24 in the feed nut 19 so that as the nut 19 is rotated, the quill and spindle are moved downwardly and upwardly depending on the extent and the direction of rotation of the nut 19. The belt 18 engages a pulley 25 secured to or forming part of the nut 19 and a pulley 26 on a shaft 27 driven by a motor 28 mounted on the frame 10.

As stated above, an object of this invention is to avoid the necessity of using indexable stop means for controlling the extent of downward movement of the spindle and thus increase the efficiency of the machine.

This is accomplished by the present invention by employing in combination a stepping motor, a non-slipping drive belt, a preloaded ball bearing screw drive for the spindle, and a programmer for controlling the step-by-step operation of the motor.

Accordingly, the motor 28 is a synchronous stepping motor, the belt 18 is a non-slipping, so-called "timing belt" and the nut 19 is preloaded to take up the lost motion between the quill 11 and the motor shaft 27, the motor being controlled by a programmer P to stop the quill, and hence the tool, at the desired precise point in its travel toward the work.

The preloaded nut 19, as shown on an enlarged scale in FIG. 2 and in section in FIG. 3, has two circuits of ballcontaining grooves 24, a circuit A and a circuit B, each circuit having its own deflector 29 and its own ball-return tube 30, as shown in FIG. 3, with the balls 23 therein engaging the continuous helical groove 22 in the quill extension 15. The ball-containing circuits A and B are offset axially from each other so that the balls in circuit A are in engagement with one side of the groove 22 in the quill extension while the balls in the circuit B are in engagement with the opposite side of the groove 22 so that balls in one circuit immediately take the load when the nut is rotating in one direction and the balls in the other circuit immediately take the load when the nut is rotated in the opposite direction.

With backlash thus eliminated, the train of operations between the nut 10 and the motor 27 being slip-proof, when the motor has rotated a predetermined number of steps, through the medium of the programmer P, the quill and spindle with the tool will stop traveling at precisely the same place every time the motor makes that particular number of steps. The programmer P is so arranged that for each different operation performed the quill will be driven to the particular point related to the particular tool used and operation being performed. According to the present invention, after the tool has been stopped, the quill will be returned to starting position by the programmer P.

In the broader aspects of this invention the extent of the return stroke of the quill may be controlled by the programmer P. However, in most situations the extent of the return stroke of the quill would be controlled by a limit switch.

For this purpose in the form of the invention herein disclosed, a radially extending lug 31, which is secured to the quill and which rides in a slot 32 in the frame and prevents the quill from rotating as it raises and lowers, has a screw 33 (FIG. 4) which extends into position to engage and operate a limit switch 35 secured to the frame 10. The limit switch 35 is arranged in a circuit including lead 36 in a cable 37 leading to the programmer P and from the latter to the motor 28 to cause the circuit to the motor to be opened. By adjusting the screw 33, the motor will stop in its upward travel when the quill is at its upper limit of travel.

To permit the rapid return of the quill to its predetermined upper limit of its travel without damaging the mechanism, there is provided a switch 38 which has a blade 40 normally in closed position which is moved to open position by a lug 41 which is mounted on the switch blade 40 and engages guide lug 31 which decelerates the motor before the limit switch 35 is engaged by the screw 33.

To limit the downward movement of the quill, spindle and tool, another limit switch 39 is positioned to be engaged by the lug 31 to open the motor circuit.

Variations and modifications may be made within the scope of the claims and portions of the improvements may be used without others.

We claim:

1. A machine tool having a spindle frame, a quill slidably mounted in said frame for axial movement therein, a spindle mounted in said quill for axial movement therewith and rotatable movement thereon, said quill having a cylindrical portion provided with an external helical groove of determinate pitch, a preloaded ball-nut mounted for rotation on said cylindrical portion and restrained from axial movement with the balls of the nut riding in said groove, means for rotating said ball-nut to drive said quill, spindle and tool therein toward and from the working comprising a stepping electric motor, non-slipping driving means between said motor and said ball-nut, and programmed control means including electric switch means for starting and stopping said motor, said control means being programmed according to the tool then in the spindle and work to be performed to stop the motor and thus the axial movement of the quill, spindle and tool at a precise predetermined position relative to the work when said motor has made a number of steps determined by said programmed control means which comprises limit switch means controlled by the quill for causing said motor to operate to return the quill and spindle with the tool therein to a predetermined starting position at the limit of its return travel.

2. A machine tool according to claim 1 in which said limit switch means includes switch means to decelerate the speed of the motor as the quill approaches the upper limit of its travel.

3. A machine tool according to claim 1 in which there is a limit switch to stop travel of the quill at a predetermined maximum limit of its travel toward the work.

* * * * *